United States Patent
Statzer

(10) Patent No.: US 9,415,298 B1
(45) Date of Patent: Aug. 16, 2016

(54) MODERN DICE

(71) Applicant: Victoria Lynn Statzer, St. Petersburg, FL (US)

(72) Inventor: Victoria Lynn Statzer, St. Petersburg, FL (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 14/745,853

(22) Filed: Jun. 22, 2015

Related U.S. Application Data

(60) Provisional application No. 62/051,432, filed on Sep. 17, 2014.

(51) Int. Cl.
  *A63F 9/04* (2006.01)
  *A63F 9/20* (2006.01)

(52) U.S. Cl.
  CPC ............... *A63F 9/0413* (2013.01); *A63F 9/20* (2013.01); *A63F 9/0415* (2013.01); *A63F 2009/0471* (2013.01); *A63F 2009/0484* (2013.01); *A63F 2009/0486* (2013.01)

(58) Field of Classification Search
  CPC . A63F 9/04; A63F 2009/04; A63F 2009/471; A63F 2009/0473; A63F 2009/0475; A63F 2009/0484; A63F 9/0413; A63F 9/0415; A63F 2009/0471; A63F 2009/0426
  USPC .................... 273/146; D21/372, 373
  See application file for complete search history.

(56) References Cited

U.S. PATENT DOCUMENTS

| | | | | |
|---|---|---|---|---|
| 985,868 | A * | 3/1911 | Walsh | A63F 9/0415 273/146 |
| 1,474,897 | A * | 11/1923 | Elliott | A63F 9/0413 273/146 |
| 2,227,406 | A * | 12/1940 | Christy | A63F 9/0413 222/486 |
| 3,233,343 | A * | 2/1966 | Short | G09B 19/26 273/146 |
| D235,570 | S * | 6/1975 | Barton | D21/499 |
| D273,688 | S * | 5/1984 | Rocco | 273/288 |
| 4,566,697 | A * | 1/1986 | Vickers | A63F 9/0415 273/138.1 |
| 5,069,647 | A * | 12/1991 | Zuviria | A63H 33/08 446/120 |
| D373,603 | S * | 9/1996 | Moradinia | D21/373 |
| D524,873 | S * | 7/2006 | Wickens | D21/373 |

* cited by examiner

*Primary Examiner* — Benjamin Layno
(74) *Attorney, Agent, or Firm* — Nicholas Pfeifer; Smith & Hopen, P.A.

(57) ABSTRACT

The present invention includes a novel and modern numbering system design modernizing the design of gaming pieces, such as dice and dominos, while maintaining the qualities of utility for which these pieces were built. The novel design adds not only a pleasing and improved visual quality, but also a tactile quality that enhances the handling of the dice.

5 Claims, 4 Drawing Sheets

MODERN DICE

CROSS-REFERENCE TO RELATED APPLICATIONS

This nonprovisional application is a continuation of and claims priority to provisional application No. 62/051,432, entitled "Modern Dice," filed Sep. 17, 2014 by the same inventor.

BACKGROUND OF THE INVENTION

1. Field of the Invention

This invention relates to dice and/or dominoes.

2. Brief Description of the Prior Art

Dice have been used for thousands of years for all types of purpose. Originally made from bones, dice have evolved in materials over the years and have altered in shape and size. Most dice are 6-sided and each side includes numerical indicators or pips—a certain number of dots equating to the number in which the particular side of the dice represents. Certain dice include particular images or symbols on each side that correspond to a particular game or purpose for which the dice was fashioned.

Similar to dice, dominos usually include numerical indicators in the form of pips on a top surface. The number of pips on each side of each domino is governed by the game or purpose for which the domino was created.

Throughout history, the size and shape of dice and dominos have varied. However, one thing that has remained constant—the use of pips and numbers as numerical indicators.

Accordingly, what is needed is a new and improved die and domino having an improved set of numerical indicators. However, in view of the art, considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an updated dice and dominoes design is now met by a new, useful, and nonobvious invention.

The novel structure includes a die comprising numerical indicators located on each side of the die, wherein the numerical indicators have one or more grooves in each side's surface and the grooves represent a numerical value. In an embodiment, the grooves extend fully between the edges of each side on which the grooves are disposed. In an embodiment, a predetermined number of grooves circumvent the entire die in a predetermined plane.

In an embodiment, the one or more grooves on each surface have a different color than the surface of the die on which the grooves are disposed. One embodiment may further comprise being constructed from laminated or composite layers of materials such that the one or more grooves are of a different material than each side's surface. The one or more grooves may also vary in depth and width from side to side such that the weight of the die is centered.

In a certain embodiment, the present invention includes a domino comprising numerical indicators located on a top surface of the domino, wherein the numerical indicators have one or more grooves in top surface and the grooves represent a numerical value.

In an embodiment, the one or more grooves have a different color than the surface of the domino. One embodiment may further comprise being constructed from laminated or composite layers of materials such that the one or more grooves are of a different material than the surface. The one or more grooves may also vary in depth and width from side to side such that the weight of the domino is centered.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
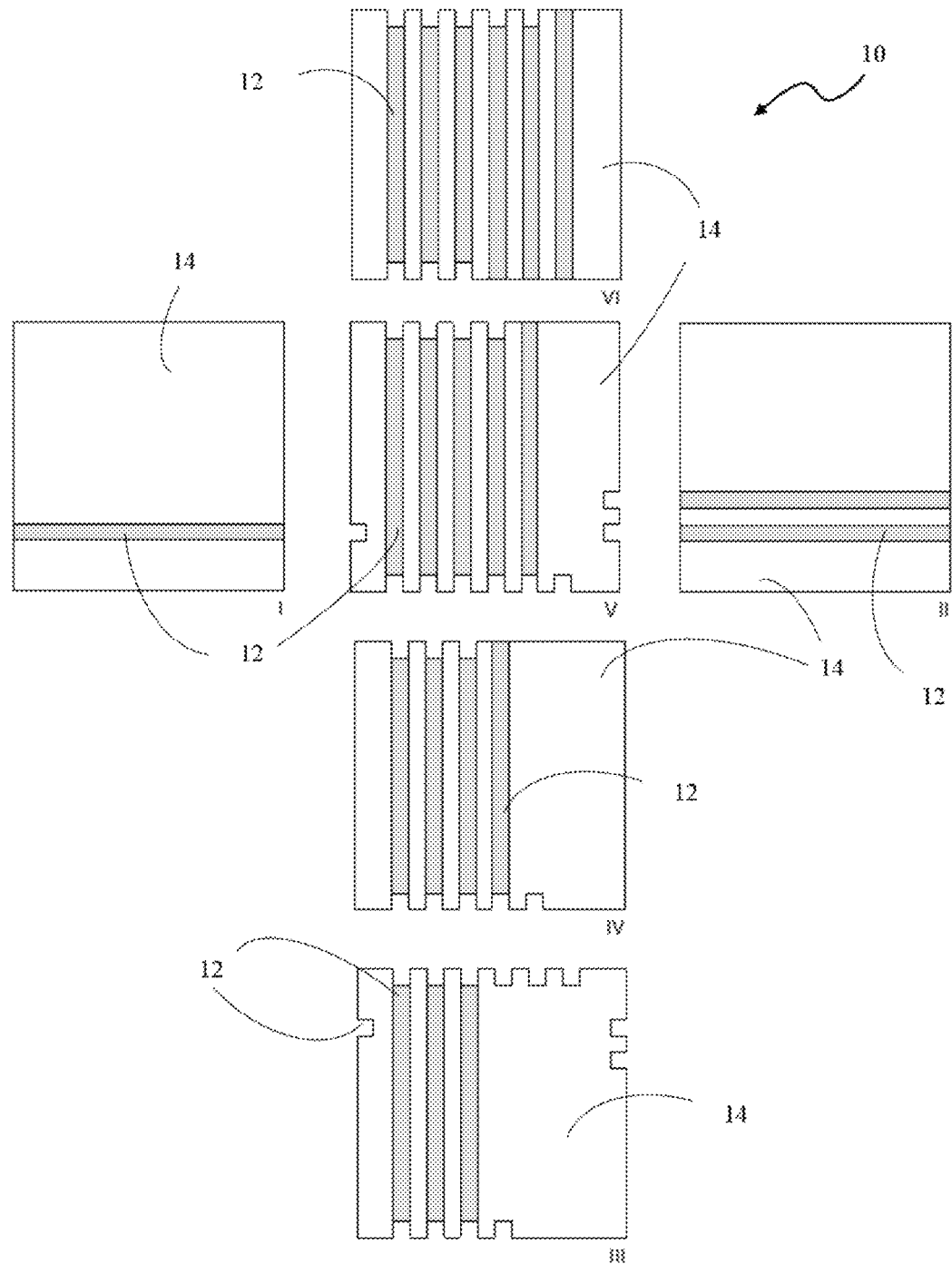
FIG. 1 depicts the six sides of a certain die embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention includes a novel design to the numbering system for dice and dominos. A system of grooves was invented to act as a numbering system for each of the six sides of the dice or two halves of a domino, creating a simple, clear, and new look for a game piece. A certain embodiment of the present invention serves as a gaming dice for any game requiring a six-sided die, or multiple six-sided dice, and has a specific emphasis on a modern and improved form of playing dice. Another embodiment includes the groove system disposed on a set of dominos. Each groove in the system represents a singular value. Therefore, six grooves represent a value of six, five grooves represents a value of five, and so on.

An object of the present invention is to provide a clear, easily identification of the numerical indicators visible on the gaming piece. A further object is to provide a user with a distinct tactile quality on the surface of each side of the die specifically through the use and handling of the gaming piece. The physicality of the grooves allow for the user to not only see, but also to feel the numbers, advancing the accessibility of the interpretation of game pieces. With easily identifiable grooves, game pieces allow visually impaired individuals to participate in activities using these gamin pieces.

In a certain embodiment, the grooves may be vertical or horizontal. In another embodiment, the grooves may be angled, in which case the grooves may or may not be connected from one side to the next. The grooves may also be centered on the face or offset. The grooves themselves may be accented with a contrasting color to the body of the game piece, or remain unison. The colors may be introduced by a paint, epoxy, or other coating. There may be separate colors for the indicators on each side. The applied coatings may each include differing densities to help maintain the balance of the die. Additionally, the dice may be constructed from laminated or composite layers of materials such that the grooves are one material and surface another.

The materials may be wood, plastic, metal or any other material or combination thereof as is known to a person having ordinary skill in the art. The edges of the dice may be square, beveled, or chamfered, and the corners may be rounded. The width and/or depth of the grooves may be varied such that the cumulative volume of the grooves on each face is equal to maintain balance of the dice. The cross section of the grooves may be any geometry such as a square, rectangle, triangle, trapezoid, semicircle, etc. The grooves may be applied to dice with any number of sides.

Example

Figure 2A:
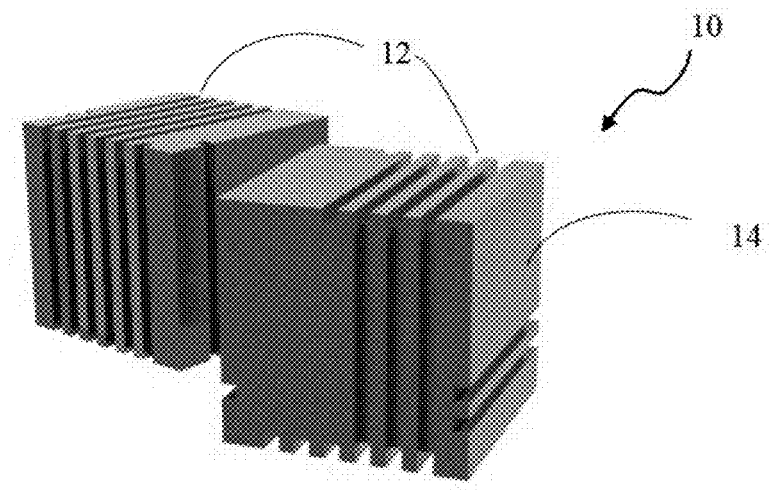
FIG. 2A is a perspective view of a certain embodiment of two dice oriented such that one dice is showing three indicators on its frontal face and the other dice is showing six indicators on its frontal face.
Figure 2B:
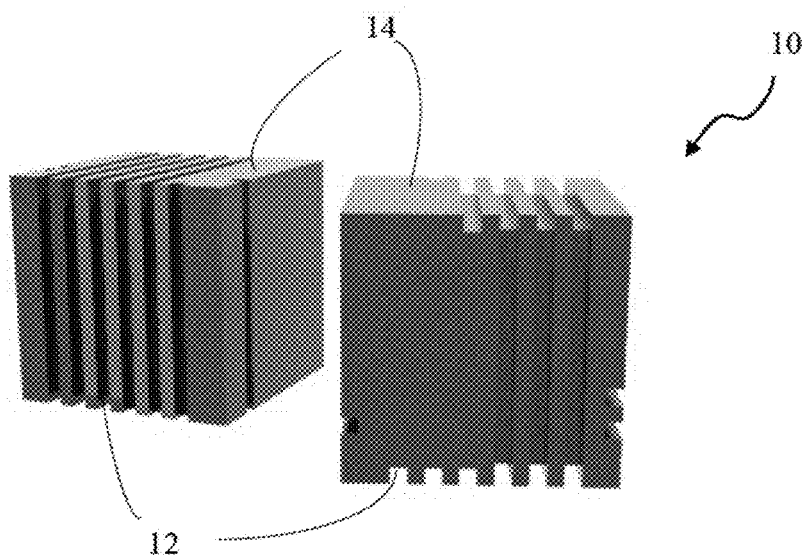
FIG. 2B is a shifted perspective view of the two dice shown in FIG. 2A.
Figure 2C:
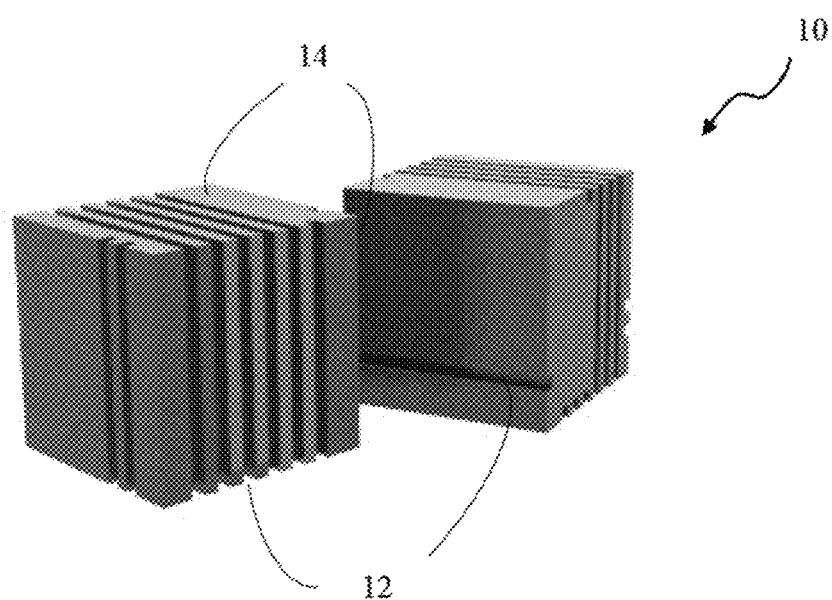
FIG. 2C is a shifted perspective view of the two dice shown in FIGS. 2A and 2B.

As shown in FIG. 1, a certain embodiment of the die, generally denoted by reference numeral 10, includes grooves 10 disposed on surface 14 of die 10. As illustrated, the embodiment includes certain grooves circumventing the die. For example, the top middle side (VI) of die 10 represents a value of six through six grooves 12. Rotating die 10 upward to reveal the face below it, side (V), reveals five grooves 12 representing a value of five. As illustrated in FIG. 1, five of the six grooves 12 from side (VI) were continued onto (V), starting with a leftmost groove 12. This pattern of continuation applies to a single direction of rotation for this embodiment and includes three grooves 12 continuously circumventing die 10 through the rotation from side (III) to side (VI). The values of one and two are indicated on the two adjacent sides (I & II) through one and two grooves 12, respectively. In this embodiment, those representative grooves 12 do not circumvent die 10. FIGS. 2A-2C show a three-dimensional model of the embodiment, depicted in FIG. 1, shown from different perspectives.

Figure 3:
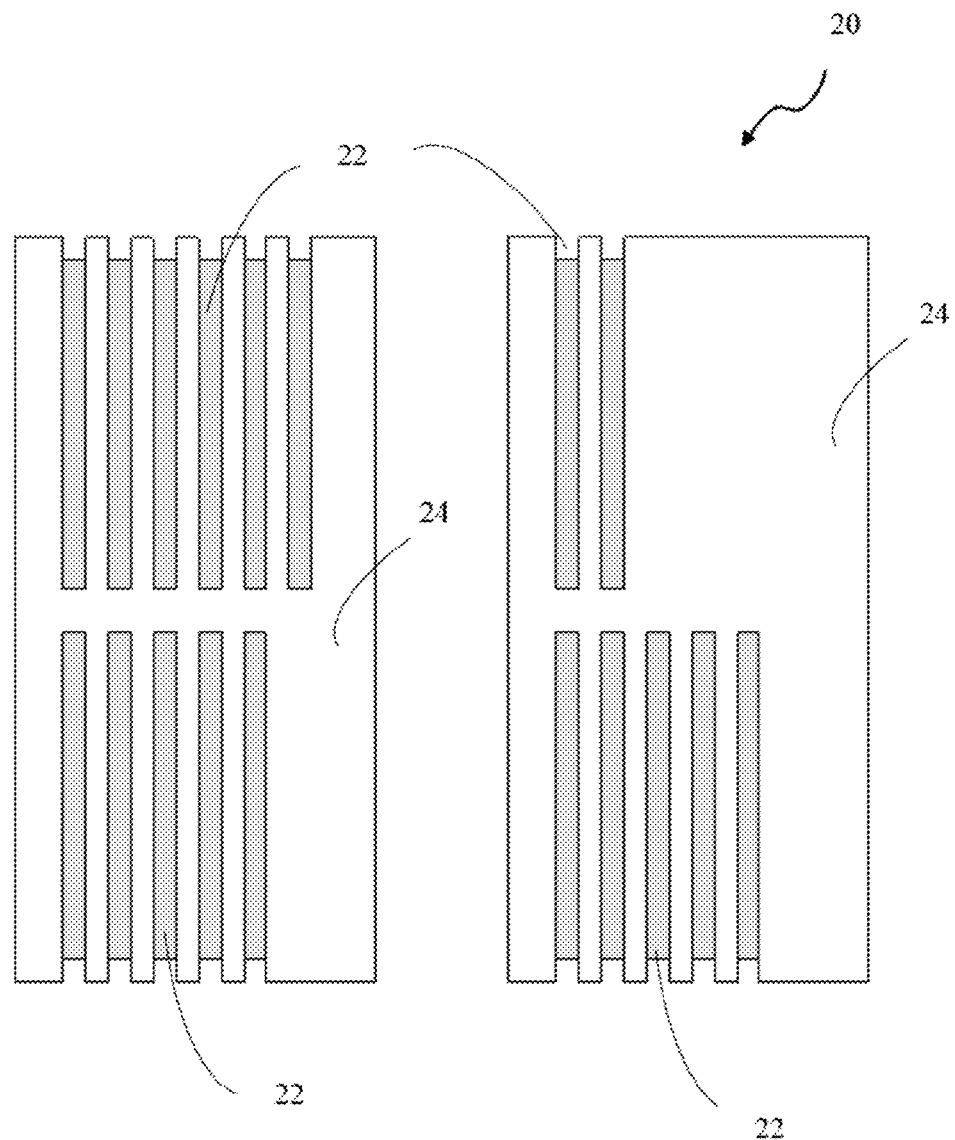
FIG. 3 is a top view of a certain embodiment of two dominos, wherein the left domino includes six numerical indicators on its top half and five numerical indicators on its bottom half; and the right domino includes two numerical indicators on its top half and five numerical indicators on its bottom half.

FIG. 3 provides an exemplary embodiment of the numbered groove system applied to dominos, generally denoted by reference numeral 20. Similar to the die embodiment, each groove 22 disposed on surface 24 is intended to represent a singular value. Thus, the left domino includes a value of six on its upper half and a value of five on its lower half. Likewise, the right domino includes a value of two on its upper half and five on its lower half. It is contemplated that the value of grooves 22 may vary depending on the use of the game pieces. Similar to the die embodiment, grooves 22 may be vertical, horizontal, or angled; they may be centered on surface 24 or offset; may be accented with a contrasting color to surface 24 of the domino or remain unison; and the cross section of grooves 22 may be any geometry known to a person having ordinary skill in the art.

The present invention provides a unique and novel game piece design intended to modernize the game pieces while also enhancing the accessibility of the numbering system.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A die having a plurality of sides, comprising:
 a numerical indicator located on each side of the die, wherein the numerical indicator includes one or more grooves in each side's surface; and a predetermined perimeter number of grooves circumvents the entire die in a predetermined perimeter plane.

2. The die according to claim 1, wherein the one or more grooves on each side of the die represent a particular value in a sequence of values.

3. The die according to claim 1, wherein the one or more grooves on each surface have a different color than the surface of the die on which the grooves are disposed.

4. The die according to claim 1, further comprising being constructed from laminated or composite layers of materials such that the one or more grooves are of a different material than each side's surface.

5. The die according to claim 1, wherein the one or more grooves vary in depth and width from side to side such that the weight of the die is centered.

* * * * *